Jan. 1, 1946.  J. C. ANDERSEN  2,392,112
INDEX MECHANISM
Original Filed Oct. 17, 1941   2 Sheets-Sheet 2
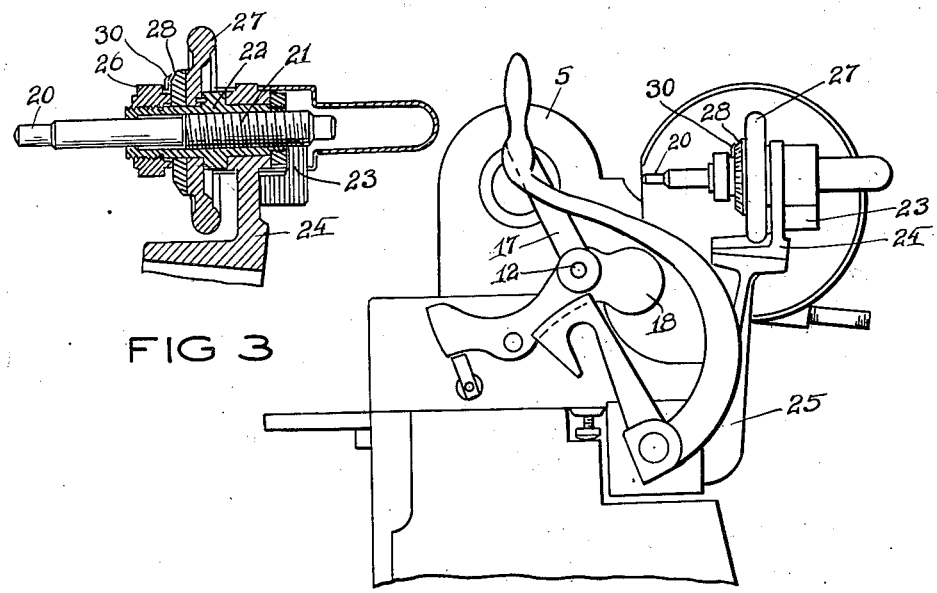
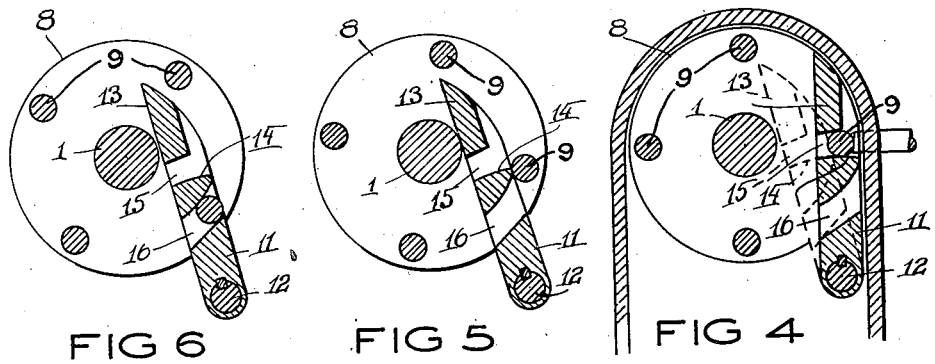
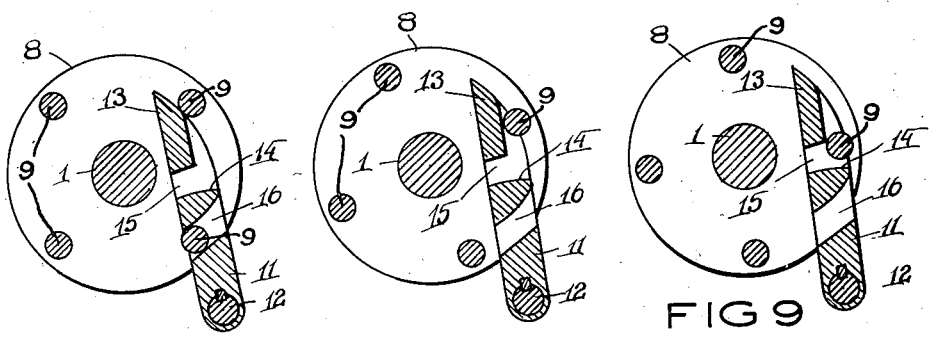
INVENTOR
JORGEN C. ANDERSEN
BY
ATTORNEY Patented Jan. 1, 1946

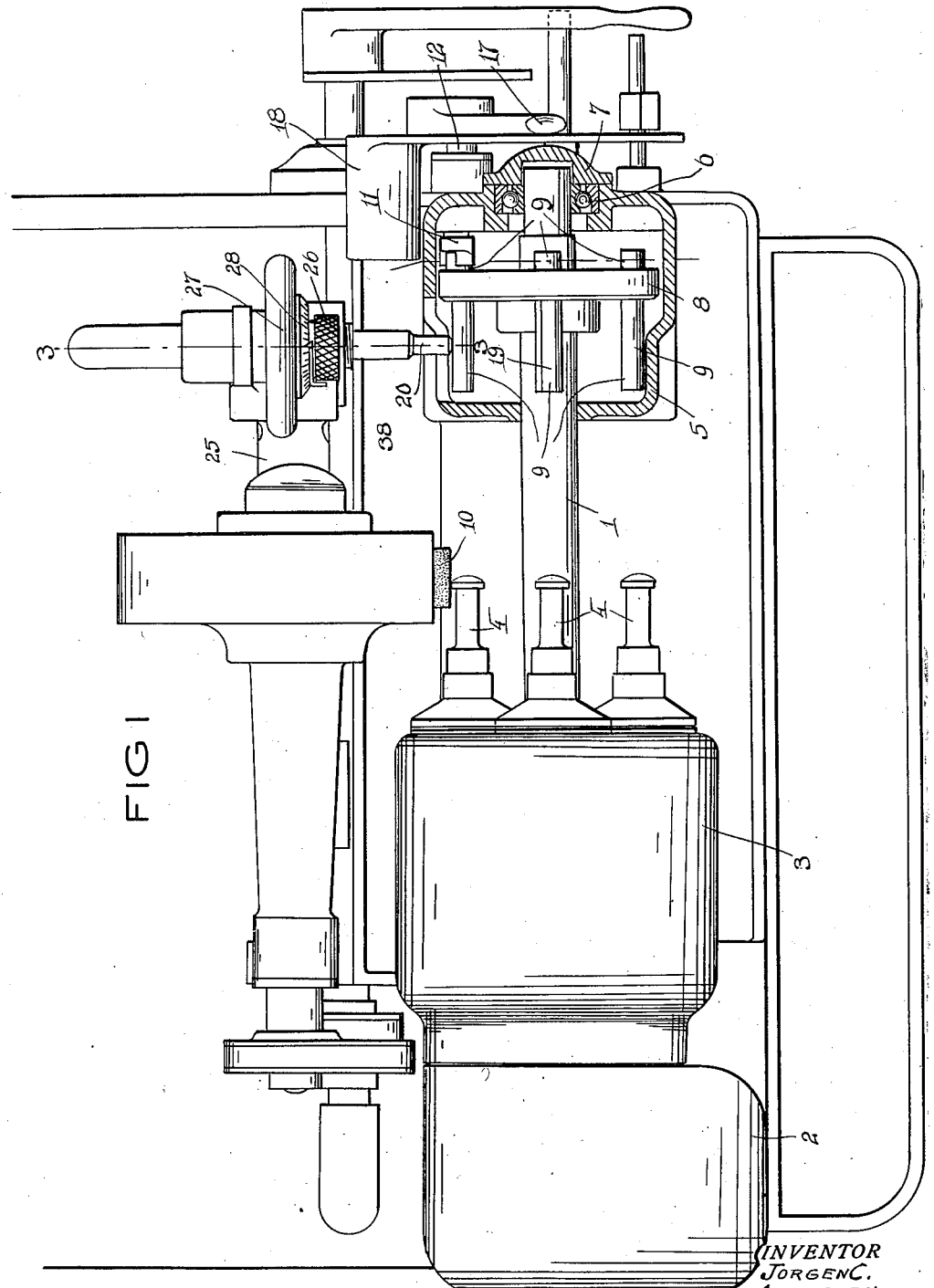

2,392,112

UNITED STATES PATENT OFFICE 2,392,112

INDEX MECHANISM

Jorgen C. Andersen, Rochester, N. Y.

Original application October 17, 1941, Serial No. 415,439. Divided and this application July 21, 1943, Serial No. 495,800

5 Claims. (Cl. 51—216)

This invention relates to indexing and locking mechanism for use with multiple spindle apparatus such as lens edge grinding machines and the principal object of the invention is to provide a novel index mechanism with which each of a plurality of spindles is accurately located at a predetermined station and held locked at this station while work is being performed on the element supported by the spindle.

This and other objects of the invention will become more readily apparent from the detailed description of the invention which follows, reference being had to the accompanying drawings in which Figure 1 is a partial top plan view of a lens edge grinding machine with parts thereof in section to illustrate the indexing mechanism embodied therein.

Figure 2 is an end elevation of the lens edge grinding machine which embodies the indexing mechanism.

Figure 3 is a vertical sectional view of the micrometer size control of the lens edge grinding machine which cooperates with the index mechanism, the section being taken on the line 3, 3 in Figure 1.

Figures 4 to 9 inclusive show progressive positions of the indexing plate and its locking mechanism as it advances from the release of one of the locking pins to the locking position of the succeeding locking pin.

This application is a division of the parent application Serial No. 415,439, filed October 17, 1941, and which is now Patent No. 2,369,114, issued February 13, 1945.

As illustrated in Figure 1 of the drawings, the lens edge grinding machine which embodies my invention in one of its forms comprises a suitable frame on which is mounted the turret shaft 1. A suitable transmission is housed in the housing 2 to operate the turret 3 and the lens supporting spindles 4, 4 carried by the turret.

The turret shaft extends thru the index housing 5 and is revolvably supported therein at the right hand end thereof by the antifriction bearing 6. Clearance in the cap 7, forming part of the index housing, permits endwise movement of the reduced end of the turret shaft 1 in the antifriction bearing to permit expansion and contraction of the turret shaft.

Keyed to the turret shaft within the index housing 5 is the index plate 8 which carries four axially extending index pins 9, 9 that are radially spaced on the index plate and concentrically arranged thereon so as to be in axial alignment with the center of rotation of the four lens supporting spindles 4, 4 carried by the turret 3.

As described in the parent application above referred to, operation of the lens supporting spindles in the turret takes place when the turret 3 is held locked against rotation with the turret shaft 1. In this locked position of the turret and turret shaft one of the spindles 4 is located near the operator at the front of the machine to permit the mounting and the centering of a lens on this spindle, while another spindle is located at the rear of the machine to have the grinding wheel 10 perform its grinding operation thereon. As one lens is mounted and centered, another is thus ground and finished. The other two spindles are located intermediate the front and rear of the machine and the one at the top carries an unfinished cut centered lens blank ready for grinding while the other carries a finished lens ready to be removed therefrom.

The turret is held locked in each of the four positions in order to fixedly locate the spindles 4 as above pointed out. The latch mechanism provided for this purpose cooperates with the index plate 8 and the index pins 9, 9 carried thereby. The index plate is keyed to the turret shaft 1 for rotation therewith, and the index pins 9, 9 are arranged on the index plate in axial alignment with the spindles 4, 4 in the turret housing 3. For the latch mechanism the index pins project from the right of the index plate for engagement with the locking latch 11. As illustrated in Figures 4 to 9 inclusive this locking latch is mounted in the bottom of the index housing 5 and is keyed to the rock shaft 12 so as to swing between the index pin extensions and the turret shaft 1 on the movement of this rock shaft. The face of the latch 11 adjacent the index plate is cut out to provide the stop and guide pad 13, the anvil stop 14, the slightly tapered locking channel 15 and the gate channel 16.

The locking position of the locking mechanism is illustrated in Figure 4 in which an index pin extension is located in the locking channel 15 and rests against the anvil stop 14 to prevent movement of the index plate in either clockwise or counterclockwise direction. In this position all other index pin extensions are free from the locking mechanism. For the release of the index mechanism, the locking latch is swung into the dotted line position illustrated in Figure 4 in which position the index plate and with it the turret is released to permit the turret driving mechanism to turn the index plate in a clockwise direction. This causes the released index pin extension to be moved downward in front of the lower portion of the latch and thru the gate channel 16 behind the latch while the following index pin extension at the top of the index plate moves in front of the upper portion of the latch to prevent return movement of the latch from its dotted line position in Figure 6 by its engagement with the guide and stop pad 13 until movement of this index pin extension is arrested by the anvil stop 14. At this point the index pin extension is free to enter the tapered locking channel 15 and swinging movement of the latch causes the index pin extension to engage into the locking channel to occupy the locking position of the previously released index pin extension illustrated in Figure 4.

For the purpose of releasing the index plate and the turret as above described, the latch 11 is operated by the lever arm 17 which is keyed to the rock shaft 12 on the outside of the index housing 5. For the return of the latch into locking position with the succeeding index pin extension as above described, the lever arm 17 is provided with a counterweight 18 which operates to automatically swing the latch from its unlocked position back into its locked position on the release of the lever arm by the operator.

From the foregoing it will be apparent that each index pin in its locked position is in line with the center of rotation of the spindle on which a lens is ground. Each spindle is thus accurately held in its locked position at the time a lens is ground thereon.

For the accurate size control of the diameter of the lenses, the index pins 9, 9 carried by the index plate 8 are provided with a flat side 19 which is accurately ground so as to be axially parallel to the spindle in the turret with which the particular index pin is aligned. The flat surfaces are radially arranged on the index plate for cooperation with the shoe 20 of the micrometer size control. This shoe is provided with the micrometer thread 21 which is threaded in the sleeve 22 but is held against rotation by the key member 23. The latter is mounted on the stationary supporting bracket 24 which forms part of the grinding wheel carriage 25 and is located to one side of the grinding wheel. Adjustably clamped to the sleeve 22 by means of the adjusting nut 26 is the dial 28. Rotation of the hand wheel 27 which is keyed or otherwise fastened to the sleeve 22 causes the sleeve 22 to move the shoe 20 in and out of the sleeve to provide a stop for the movement of the grinding wheel 10 into grinding contact with the edge of the lens and permits gradual grinding of the lens edge on further adjustment of the shoe to the desired diameter as finally indicated by the pointer 30 on the dial 28. The dial 28 is held locked against the handwheel for rotation therewith but may be released for adjustment relative to the pointer 30 for its starting position.

In this way the operation of the shoe by the handwheel accurately feeds the grinding wheel against the lens edge while the sliding contact of the shoe with the flat side of the index pin accurately guides the grinding wheel back and forth over the lens edge in axial alignment therewith.

I claim:

1. In an indexing mechanism the combination of a shaft, a plurality of spindles carried by said shaft axially parallel thereto, indexing members carried by said shaft in axial alignment, one for each of said plurality of spindles, and in axial alignment therewith, a locking latch mounted for movement into engagement with said indexing members, a locking anvil on said arm for consecutive engagement with each of said indexing members to arrest the movement thereof, a gate in said arm below said anvil for movement of the indexing member from one side of the locking latch to the other on the withdrawal of the anvil from the indexing member, and stop and guide means on said latch above said locking anvil for engagement with the index pin to arrest the movement of said latch and guide the index pin into engagement with said anvil.

2. In an index mechanism as set forth in claim 1 with a restricted channel in said locking latch leading to one side of said anvil to cause the index pin held by said anvil to enter said channel on the movement of said latch.

3. In an indexing mechanism the combination of a shaft, a plurality of supporting spindles carried by said shaft axially parallel thereto, indexing members carried by said shaft, one for each of said spindles, and axially in alignment therewith, a locking latch movable into and out of engagement with each of said index members, a locking channel extending transversely of said latch for holding said index members against movement, and guide means extending longitudinally of said latch for guiding said index members into said locking channel.

4. In a combined indexing and guiding mechanism the combination of a shaft, a plurality of supporting spindles carried by said shaft axially parallel therewith, a plurality of indexing members, one for each of said spindles carried by said shaft in axial alignment with said spindles, a locking latch mounted for movement into and out of engagement with each of said indexing members, guide means in alignment with said indexing members in their locked position, and a movable guide for engagement of said guide means provided by said indexing members during their locked position.

5. In an indexing mechanism as set forth in claim 4 in which said movable guide carries adjusting means movable toward and away from the indexing members.

JORGEN C. ANDERSEN.